United States Patent Office 3,027,276
Patented Mar. 27, 1962

3,027,276
CROCK-PROOF SUEDES AND METHODS
OF MAKING SAME
Jerome M. Cohen and Sarkis S. Saryan, Wilmington, Del., assignors to Allied Kid Company, Wilmington, Del., a corporation of Massachusetts
No Drawing. Filed May 15, 1959, Ser. No. 813,359
11 Claims. (Cl. 117—142)

This invention relates to means for rendering sueded surfaces, particularly suede leathers, non-crocking, and to the improved products resulting. More particularly, the invention relates to the treatment of suede leathers or the like with liquid polyisocyanate prepolymers whereby the suede surface is protected against crocking with no loss of the desirable soft feel of the suede or impairment of its appearance.

Suede leather is produced by abrading the flesh side of tanned skins to produce a pile or nap of upstanding fibers to produce the pleasing soft velvety feel characteristic of suede leather. Customarily, the leather is colored by dye or pigment colors, either before or during, but generally after the sueding operation. Regardless of when the coloring is done, the suede has a tendency to "crock," i.e., to rub color off onto surfaces with which it comes in rubbing contact. This is due to two causes. One is the fact that no matter how thoroughly the suede is brushed after abrasion, the surface retains small particles of leather dust which will transfer to other surfaces on rubbing. The second reason for crocking is that the fiber pieces which form this nap of the suede are susceptible to being actually abraded by any rubbing contact, and even dust-free suedes fill therefore crock.

The obvious method of preventing or reducing crocking is the application of a film of coating material to the suede leather to cover the fibers and the dust, and thus prevent the transfer of colored particles from the suede. Many types of materials have been tried, but prior to the present invention, no completely satisfactory treatment has been achieved. Where sufficient coating has been applied to achieve adequate protection against crocking, there has been a tendency to cause cementing of the fibers, with some loss of the desirable suede feel. A second undesirable result is known in the trade as "bottoming"; this is a tendency of the coating material to bridge between adjacent fibers while retaining some air below the coating material film. This entrapment of air causes the color to appear whiter, so that the desired appearance is impaired, particularly in the case of black suedes, which appear gray as a result.

Prior to the instant invention, best results in the field were obtained with solutions of butadiene-acrylonitrile elastomers, either in the form of latices or in solvent solution. Such elastomeric materials, when applied as thin liquids, give reasonably good crock-resistance and produce very little impairment of the desirable suede feel. But these products produce a marked graying of black suedes, and a corresponding impairment of the color with suedes of other colors.

The principal object of this invention is the production of crock-proofed suede leathers without substantial loss of the desirable suede feel and without substantial graying of the color.

This and other objects are obtained, according to the present invention, by applying to pieces of the sueded colored leather containing free moisture a coating of a thin, low solids solution of a prepolymer of a polyisocyanate in a volatile organic solvent therefor and drying the pieces to complete reaction with the free moisture in the pieces, preferably by heating in a humid atmosphere to retard evaporation of the moisture in the pieces. Surprisingly enough, the application of polyisocyanate prepolymer coats the individual fibers without bridging or bottoming, and thus produces a film on and about the individual pile fibers.

It is believed that the unique results are obtained because the suede contains free moisture, which is a known curing agent for polyisocyanate prepolymers, producing cured polyurethanes therefrom. Furthermore, the leather substance contains terminal amino and hydroxy groups capable of reacting with the isocyanate in the presence of moisture. While the typical coating dries from the top down, and thus is at its most viscous adjacent the surface of the film, the polyisocyanate prepolymer, in this application, begins to set up adjacent the moisture-containing fiber. As the film shrinks on drying, bridging films are torn apart by the fact that the greatest adhesiveness of the film is at its interface with the fibers of the leather, and this in turn ensures a flow of the thinner surface film to the bottom of each pile fiber, ensuring the absence of bottoming and the attendant grayness.

One spray coat is enough to produce the desired crock-proofing with most colors. With very deep colors, and particularly with black suedes, it is preferable to use a two or even a three coat system, both to more fully protect against crocking and to deepen and intensify the color. In such a two coat system, the first coat may be simply air dried without heat, but is preferably dried by heating in a humid atmosphere, and a second coat applied over it, and dried in the air, or preferably by exposure to low heat in a humid atmosphere. With dark colors, the first coat is preferably applied to the sueded leather pieces or skins while they are tumbling in a rotating drum through the gudgeon. Here, the tumbling action equalizes the coating, improves the nap of the suede, and intensifies the color. Top coats are applied by spray. With light colors, however, even the first coats are applied by spray, since the tumbling tends to discolor the light leathers.

A simplified flow diagram of the method is as follows:

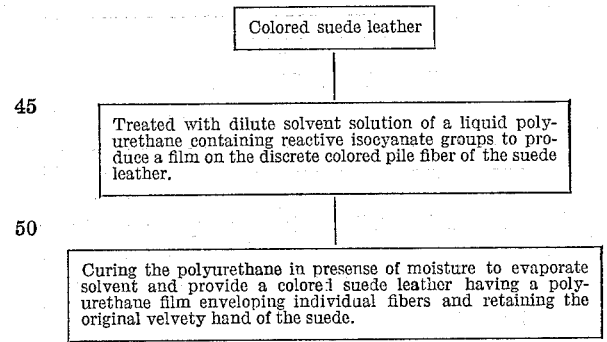

In the practice of the invention, the coating employed is characteristically a prepolymer of a polyisocyanate, preferably an aromatic polyisocyanate, such as toluene diisocyanate, partially reacted with a suitable bifunctional reactant containing terminal hydroxyl groups and capable of further reaction with hydroxyl or amino groups to produce a cured polyurethane. It will be obvious that any such prepolymer, which will react with the free moisture in the skins, will give the type of coating desired, if distributed on the suede pieces, from a low viscosity, low solids solution in sufficient quantity to give a thin film.

We have used various commercial prepolymers of this general type available on the market, including Du Pont's Adiprene L (prepolymer of toluene diisocyanate and polyethylene glycol), Du Pont's EDC-154 (toluene diisocyanate reacted with polypropylene glycol, 1,3- butane diol and trimethylol propane), Du Pont's EDC-167 (like Adiprene L but lower molecular weight, Spencer-Kellogg's XP-1190 (similar to EDC-154), and Mobay's Mondur CB-75 (a similar toluene diisocyanate prepolymer).

Typically, the first coat, whether used as a base or a one coat system, contains 10% to 20% of the polyisocyanate prepolymer, either alone or admixed with some plasticizer, in a strong solvent therefor, such as toluene or xylene. It is preferably uncolored, but may contain some color pigment. The top coats, where used, generally contain 5% to 10% polyisocyanate prepolymer, and preferably also contain some color pigment or dye to match the color of the suede on which they are used. Where color pigment is used, some additional film former is generally employed because of the poor pigment wetting properties generally shown by polyisocyanate prepolymers.

The coatings are applied to give from about ¼ to 1 gram dry weight of the polyisocyanate prepolymer per square foot of suede surface, the concentration being varied with the original crockiness of the suede and the color. With black leathers, where three coats are applied, there is thus a maximum of about 3 grams of polyisocyanate prepolymer used per square foot of suede.

In the processing of leather for this invention, there is generally employed soft leather, such as that made from kid skins. This leather is processed into suede in conventional fashion by abrading the skin to raise a nap, and brushing to remove most of the debris, and then dyed as desired. The skins are then dried and reconditioned to contain about 20% to 25% of moisture.

With dark colored suedes, the skins are placed in a rotating drum conventionally used in the trade, and the first solution is sprayed onto the rotating skins through the gudgeon of the drum. Typical solutions which can be employed are the following:

EXAMPLE I

Plasticized First Coat

| | Parts by weight |
|---|---|
| Adiprene L | 15 |
| Xylene | 75 |
| Dimerized fatty acids | 10 |

EXAMPLE II

Unplasticized First Coat

| | Parts by weight |
|---|---|
| Adiprene L | 11.4 |
| Xylene | 44.3 |
| Toluene | 44.3 |

The Adiprene L (Du Pont) is a prepolymer of toluene diisocyanate and polyethylene glycol. It has a S.G. of 1.06, a viscosity at 86° F. of 140 to 190 poises, at 212° F. of 5 to 6 poises, and contains 4.0–4.3% of isocyanate groups by weight. In the above formulations, it can be replaced by EDC-154 (Du Pont), EDC-167 (Du Pont), XP-1190 (Spencer-Kellogg), Mondur CB-75 (Mobay), and by other aromatic polyisocyanate prepolymers, which will react with the water in the skin so that the prepolymers dry from the bottom up. The first coat is preferably sprayed hot while the skins are rotating. When enough has been sprayed on to provide the desired very thin film on the skins (¼ to 1.0 gram of dry polyisocyanate prepolymer), tumbling without spray is continued for several hours in order to equalize the distribution of the coating. During this operation, the nap of the suede is improved and the color deepened, while the action of the water in the skins together with the tumbling, prevents bridging of the fibers by the coating, and ensures complete coverage all the way to the bottom of the individual pile fibers.

The skins are then withdrawn from the drums and are preferably toggled on frames; they are then heated in an oven, preferably at 110° F. to 130° F. for 30 minutes to 1 hour to complete the cure of the first coat. In this operation, a substantial conversion to polyurethane is obtained. The atmosphere in the oven is maintained near saturation with moisture vapor to slow up the evaporation of the free water in the skins to ensure that it reacts with the prepolymer. Low temperatures are used to ensure that the films will dry from the bottom, and not bridge between the pile fibers.

The oven curing may be replaced by overnight air drying, but this is generally unsound economically, since it is difficult to find room to store the skins for the overnight curing time needed.

With light colors, the skins are sprayed with sufficient material to give about ¼ to 1.0 gram of polyisocyanate prepolymer per square foot, and the skins are passed directly into the above describd oven to cure the coating.

Whereas the single coat is sufficient to cure crocking with light colored suedes, with dark colors, there is still some residual crocking displayed at this point. A second coat (and occasionally a third) is therfeore applied, preferably sprayed on. The same materials may be used as for the base coat. Thus, a satisfactory coating consists of:

EXAMPLE III

Finish Coat

| | Parts by weight |
|---|---|
| Adiprene L | 6 |
| Xylene | 32 |
| Toluene | 60 |
| Flexol plasticizer B-400 (Union Carbide & Carbon Co.) | 2 |

In this formation, the Adiprene L may be replaced by the other specific toluene diisocyanate prepolymers disclosed in Example II, and the particular plasticizer employed may be replaced by similar plasticizers, e.g. dioctyl phthalate, etc.

Where pigment is used in the top coat, it is desirable to employ a good pigment dispersing medium along with the isocyanate prepolymer. A typical example of such a formulation is the following:

EXAMPLE IV

Pigmented Finish

| | Parts by weight |
|---|---|
| Adiprene L | 5.4 |
| Hycar 1432 (butadiene acrylonitrile elastomer) | 2.4 |
| Color pigment | 1.2 |
| Xylene | 43.0 |
| Methyl isobutyl ketone | 48.0 |

The pigment is ground in a ball mill in a solution of the Hycar in the ketone (1 pound per gallon) for 48 hours. The pigment used is picked to match the color of the suede, and the ordinary pigment colors are satisfactory—carbon black, the phthalocyanine blues and greens, iron oxide reds, phospho-tungstate lakes, titanium dioxide, and the like. The Hycar is an excellent dispersion medium for the color; it can be replaced by plasticizers as a color dispersion medium.

The second coat is sprayed on, using enough to supply about ¼ to 1 gram dry weight polyisocyanate prepolymer per square foot. The coating is then cured, as was the first coat, by exposing to an atmosphere almost saturated with water vapor at 120° F. to 150° F. The heat evaporates the solvent, and the prepolymer is converted by the water in the skin and in the air to a set polyurethane film which now completely protects the color from crocking off.

The moisture in the oven acts to slow up the evaporation of the water in the skins to set the polyurethane, and actually restores moisture to the skins, rendering them softer and more supple. Furthermore, the treatment tends to further intensify the color.

The resultant skins are generally completely crock-proof, yet have the soft feel and velvety touch of an uncoated suede, indicating that the polyurethane film has caused no appreciable cementing of the pile fibers.

It is not possible to give precise limits as to the amount of liquid coating formulation to apply in any case, for this will vary depending upon the nature of the material—the particular kind of leather; the amount of buffing; the amount of dust; pigment or dye used; etc. In general, the amount of the formulation used is usually sufficient to give ¼ to 1.0 gram of polyisocyanate prepolymer per coat and to wet the material and penetrate the nap and fibers, so that when the solvents have been evaporated, there remains a permanently soft, pliable film that covers and surrouds each fiber and is mechanically and chemically anchored thereto.

As regards the selection of the polyurethane film-forming material, the only requirements are that the polyisocyanate prepolymer be liquid, having been prepared under anhydrous conditions so that it can be cured to a solid film by water and be non-irritating to the skin.

Suitable organic polyisocyanates include aliphatic polyisocyanates, such as ethylene diisocyanate, propylene diisocyanate, butylene diisocyanates; aromatic polyisocyanates, such as phenylene diisocyanates, toluene diisocyanates. Numerous additional operable polyisocyanates are disclosed by Siefkin in "Annalen der Chemie," vol. 562, pp. 121–135, this disclosure being incorporated herein by reference.

As the other polyurethane-forming reactant, any organic bifunctional material containing terminal aliphatic hydroxyl groups may be used. This includes alkyds, polyalkylene glycols, polyalkylene dialcohols, and the like. The alkyd may be prepared in the conventional manner by reacting a suitable diol with dicarboxylic acid. Suitable diols include ethylene glycol, propylene glycol, 1,3-propane diol, 1,4-butane diol, etc. Suitable dicarboxylic acids include aliphatic acids having 4–10 carbon atoms, such as succinic acid, glutaric acid, adipic acid, azelaic acid, sebacic acid, etc. Polyalkylene glycols such as polyethylene glycol, polypropylene glycol, and the like, or polyalkylene dialcohols such as ethylene glycol, propylene glycol and butylene glycol can be substituted, in whole or in part, for the alkyd.

Of course, other suitable components can be added to the spray formulation to secure certain desired properties. For instance, liquid epoxy resins may be added to improve the quality of the pigment colors. Plasticizers such as dioctyl phthalate, polypropylene glycol, dibutyl phthalate and derivatives thereof may be added to improve the flexibility. Fillers may also be incorporated.

It will be understood that modifications can obviously be made as desired without departing from the spirit or scope of our invention, which is defined by the claims.

What is claimed is:

1. The colored crock-proof suede leather produced by abrading the flesh side of tanned skins to produce a pile of upstanding discrete fibers and coloring the fibers, each of the colored fibers being covered with a thin protective film chemically anchored to the fiber, which film consists essentially of a cured polyurethane reaction product of a liquid polyisocyanate prepolymer containing reactive isocyanate groups and water, the colored fibers having the film thereon being free and not cemented or bridged to adjacent fibers so that the suede retains its velvety hand.

2. The crock-proof leather of claim 1, wherein the polyisocyanate prepolymer is made by the reaction of an organic diisocyanate with an organic bifunctional reactant having terminal hydroxyl groups.

3. The crock-proof leather of claim 2, wherein the organic bifunctional reactant is selected from the group consisting of an alkyd polymer, a polyalkylene polyether and a polyalkylene dialcohol.

4. The crock-proof leather of claim 1, wherein the liquid polyisocyanate prepolymer is the reaction product of a toluene diisocyanate and a polyethylene glycol.

5. The method of rendering colored suede leather substantially non-crocking, which comprises applying to the discrete colored pile fiber surface of the suede while the fibers are in a moist condition, a dilute solvent solution of a liquid polyurethane containing reactive isocyanate groups and being a reaction product of an organic diisocyanate and a bifunctional reactant having terminal alcoholic hydroxyl groups in an amount to produce a film on said fibers, the weight of said film per square foot of said surface being not more than 1 gram, and curing the polyurethane by means of moisture in the suede while evaporating the solvent from the polyurethane to provide a suede leather having a polyurethane film surrounding and enveloping the individual fibers but not bridging adjacent fibers, thus retaining the original velvety hand of the suede.

6. The process as defined in claim 5 in which the curing of the polyurethane film on the suede is effected by heating the suede in a moist atmosphere to evaporate the solvent for the polyurethane.

7. The method as defined in claim 5, in which the liquid polyurethane is the reaction product of a toluene diisocyanate and diethylene glycol.

8. The method of rendering colored suede leather substantially non-crocking comprising applying a dilute solvent solution of a liquid polyurethane upon the surface of the moist suede leather skin to provide a first film containing not more than 1 gram of said polyurethane per square foot of skin surface, said liquid polyurethane containing reactive isocyanate groups and being the anhydrous reaction product of an organic diisocyanate and a bifunctional reactant having terminal alcoholic hydroxyl groups, heating said skin in a moist atmosphere to thereby evaporate the solvent for the polyurethane and polymerize and cure the polyurethane by means of the residual water in the skin, applying to said skin a second similar dilute solution of a liquid polyurethane to provide an overlying film containing not more than 1 gram of said polyurethane per square foot of skin surface and curing said overlying film by heat and humidity, thereby providing a suede leather having a polyurethane film surrounding and enveloping each individual fiber on the suede surface but enabling each fiber to function as a single free discrete entity that is not bridged or cemented to adjacent fibers, thus retaining the original velvety hand of the suede.

9. The method of claim 8 wherein the liquid polyurethane is the reaction product of a toluene diisocyanate and a polyethylene glycol.

10. The method of claim 8 wherein the solution of liquid polyurethane is applied to the leather surface by spraying.

11. The method of rendering darkly colored suede leather substantially non-crocking comprising applying a dilute solvent solution of a liquid polyurethane upon the fiber surface of moist suede leather skins to provide a first film containing not more than 1 gram of said polyurethane per square foot of skin surface, said liquid polyurethane containing reactive isocyanate groups and being the anhydrous reaction product of an organic diisocyanate and a bifunctional reactant having terminal alcoholic groups, tumbling said skins during and after application of the liquid polyurethane to distribute the polyurethane, and thereafter heating said skins in a moist atmosphere to thereby evaporate the solvent for the polyurethane and polymerize and cure the polyurethane by means of the residual water in the skin, applying to said skin a second similar dilute solution of a liquid polyurethane to provide an overlying film containing not more than 1 gram of said polyurethane per square foot of skin surface, and curing said overlying film by heat and humidity, thereby providing a colored suede leather having a thin composite film surrounding and enveloping each individual colored fiber on the suede surface but enabling each fiber to function as a single free discrete entity that is not bridged or cemented to any adjacent fiber, so that the suede retains its original velvety hand.

References Cited in the file of this patent

UNITED STATES PATENTS

| | | |
|---|---|---|
| 2,531,392 | Breslow | Nov. 28, 1950 |
| 2,657,151 | Gensel et al. | Oct. 27, 1953 |
| 2,818,404 | Hill | Dec. 31, 1957 |
| 2,828,221 | McWherter et al. | Mar. 25, 1958 |
| 2,884,340 | Loshaek | Apr. 28, 1959 |
| 2,901,467 | Croco | Aug. 25, 1959 |
| 2,955,958 | Brown | Oct. 11, 1960 |

FOREIGN PATENTS

| | | |
|---|---|---|
| 638,118 | Great Britain | May 31, 1950 |
| 815,185 | Great Britain | June 17, 1959 |

OTHER REFERENCES

Bayer: "Polyurethanes," Modern Plastics, June 1947, pages 149–152, 250, 252, 254, 256, 258, 260 and 262.